United States Patent [19]

Holland

[11] Patent Number: 5,421,930
[45] Date of Patent: Jun. 6, 1995

[54] OPTICAL FIBER ROUTING METHOD AND APPARATUS

[75] Inventor: William R. Holland, Ambler, Pa.

[73] Assignee: American Telephone and Telegraph Company, New York, N.Y.

[21] Appl. No.: 143,670

[22] Filed: Nov. 1, 1993

[51] Int. Cl.$^6$ .................. B29C 65/48; H05K 3/10
[52] U.S. Cl. .................. 156/166; 156/176; 156/361; 156/436; 156/574; 29/846; 29/850; 242/7.02
[58] Field of Search ............ 156/176, 436, 523, 574, 156/361; 29/846, 850, 739, 759; 140/92.1; 242/7.13, 7.14, 7.02

[56] References Cited

U.S. PATENT DOCUMENTS

| | | | |
|---|---|---|---|
| 3,674,914 | 7/1972 | Burr | 156/436 X |
| 3,769,125 | 10/1973 | Bethge | 156/176 X |
| 3,960,309 | 6/1976 | Hazel | 29/850 X |
| 4,450,623 | 5/1984 | Burr | 29/850 |
| 4,693,778 | 9/1987 | Swiggett et al. | 29/850 X |
| 5,259,051 | 11/1993 | Burack et al. | |
| 5,292,390 | 3/1994 | Burack et al. | 156/176 |

Primary Examiner—Jeff H. Aftergut
Attorney, Agent, or Firm—Roderick B. Anderson

[57] ABSTRACT

A winding tool (14) is provided on a manipulator (18) of a type used to route the optical fiber. A hook (22) extends from the winding tool to capture optical fiber (10) extending from a device (11), and the hook is retracted to secure the fiber. A routing wheel (17) is positioned between the device (11) to which the optical fiber is connected and the reel such that the wheel can press the optical fiber (10) against an adhesive-coated substrate. The winding tool then winds the optical fiber around a reel (16). The optical fiber next feeds from the reel (16) to the routing wheel (17) as the manipulator (18) is moved to route the optical fiber on the coated substrate. Preferably, prior to the winding and wheel positioning step, the optical fiber between the reel and the routing wheel is engaged with an alignment tool (27). The fiber is secured in the alignment tool during the winding step, and the alignment tool insures engagement of the periphery of the routing wheel with the optical fiber after the winding step.

21 Claims, 4 Drawing Sheets

OPTICAL FIBER ROUTING METHOD AND APPARATUS

TECHNICAL FIELD

This invention relates to methods and apparatus for routing optical fiber and, more particularly, for routing optical fiber that is connected to a device.

BACKGROUND OF THE INVENTION

The copending application of Burack et al., Ser. No. 07/936,484, filed Aug. 28, 1992, now U.S. Pat. No. 5,259,051, granted Nov, 2, 1993, hereby incorporated by reference herein, describes a unique method for routing optical fibers on an optical backplane as is deskable, for example, for interconnecting printed wiring boards of an electronic system. The Burack et al. apparatus uses a robotic manipulator having a vertical axis that can be controlled to move in X and Y directions and in the $\theta$ direction around its vertical axis. A rotatable routing wheel is mounted on a free end of the manipulator, and a reel containing optical fiber to be routed is mounted on one side of the manipulator. The fiber is threaded over a peripheral portion of the routing wheel such that the wheel can press the fiber against an adhesive-coated surface of a substrate to cause it to adhere to the coated surface. The manipulator is then moved at an appropriate speed and direction to cause the wheel to rotate and to exert sufficient tension on the optical fiber to cause it to unwind from the reel and to be fed to the routing wheel for adherence to the coated surface, thereby to form a continuous optical fiber portion extending along, and adhered to, the coated surface.

In the production of photonic or optical devices of a type to be used in conjunction with an optical backplane, it is customary to package the devices such that optical fibers (known in the art as "pigtails") extend from the devices. One could form the optical backplane with different optical fiber and then splice the optical backplane fiber to the fiber extending from the device; but it would be preferable if one could route the fiber extending from the device directly onto the optical backplane. There is therefore a need for a technique to improve the placement and routing of optical fibers extending from, and connected to, devices.

SUMMARY OF THE INVENTION

In an illustrative embodiment of the invention, a winding tool is provided on a manipulator of a type described in the Burack et al. application. A hook extends from the winding tool to capture optical fiber extending from the device, and the hook is retracted to secure the fiber. The routing wheel is positioned between the device to which the optical fiber is connected and the winding tool such that the routing wheel can press the optical fiber against an adhesive-coated substrate. The winding tool then winds the optical fiber around the reel. The optical fiber next feeds from the reel to the routing wheel, as the manipulator is moved, to route the optical fiber on the coated substrate. Preferably, prior to the routing wheel positioning and the winding step, the optical fiber between the reel and the routing wheel is engaged with an alignment tool. The fiber is secured in the alignment tool during the winding step, and the alignment tool insures engagement of the periphery of the routing wheel with the optical fiber after the winding step.

These and other objects, features and benefits of the invention will be better understood from a consideration of the following detailed description taken in conjunction with the accompanying drawing.

DETAILED DESCRIPTION

Figure 1:
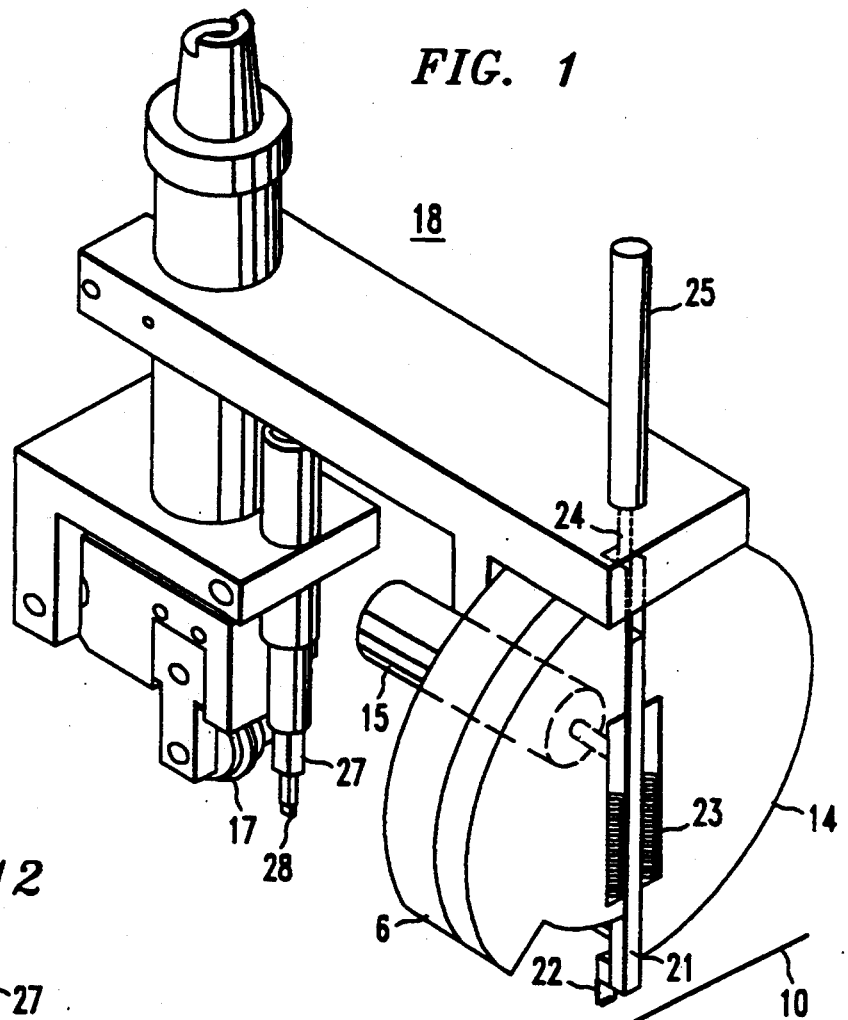
FIG. 1 is a perspective view of optical fiber winding and routing apparatus in accordance with an illustrative embodiment of the invention.
Figure 2:
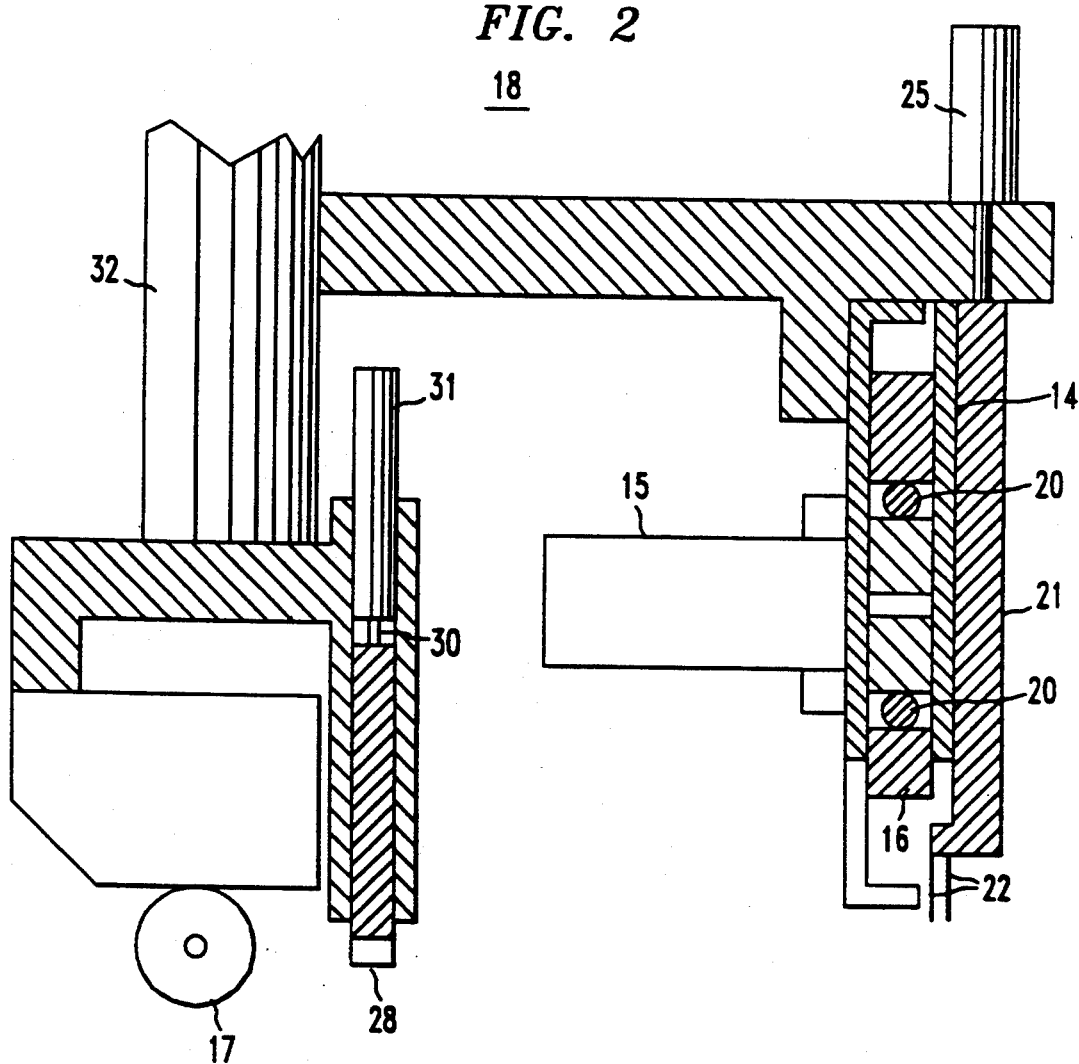
FIG. 2 is a side sectional view of the apparatus of FIG. 1.

The drawings are intended to be schematic and have been simplified somewhat in the interest of clarity. FIGS. 1 and 2 illustrate a manipulator 18, the purpose of which is to wind optical fiber 10 extending from a device 11 onto a reel such that it can thereafter be unwound from the reel and routed on an adhesive surface, in accordance with the principles of the Burack et al. application. The device 11 is mounted on a mounting plate 12 having a standoff device 13 containing grooves into which the optical fiber 10 can be fitted. The purpose of the mounting plate and standoff device is to locate the optical fiber 10 at a specified position and to provide a gap between the optical fiber and the surface so that it can be picked up by the apparatus. The manipulator 18 comprises a winding tool 14 which is rotatable by a motor 15. The purpose of the winding tool is to wind the optical fiber around a reel 16 (shown in FIG. 2) preparatory to routing. After it has been wound on the reel, the optical fiber is fed to a routing wheel 17 which presses it against an adhesive surface for routing, in accordance with the Burack et al. application.

The winding tool 14 is rotatable with respect to the spool 16 by virtue of various bearings 20, shown schematically. The winding tool 14 includes a spring-biased bar 21 containing a hook 22 at one end thereof. The bar 21 is biased upwardly by coil springs 23 and can be moved downwardly by a piston 24 controlled by an air cylinder 25. FIG. 1 shows the piston 24 in an extended position, and FIG. 2 shows it in a retracted position. In practice, a cover plate, which has not been shown, covers coil springs 23.

Figure 12:
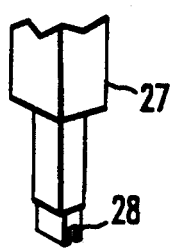
FIGS. 12 and 13 are enlargements of portions of the apparatus of FIG. 1.
Figure 3:
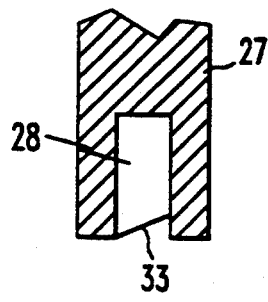
FIG. 3 is a detail of part of the alignment tool of FIGS. 1 and 2.

As described in the Burack et al. application, the routing wheel 17 contains grooves for holding optical fibers. Aligned with the wheel is an alignment tool 27 having at one end a groove 28 for holding the optical fiber in alignment with a groove on the periphery of routing wheel 17. An enlarged detail of the tool 27 and groove 28 is shown in FIG. 12. The alignment tool can be extended vertically downwardly by a piston 30 controlled by an air cylinder 31; it is also retractable with the piston 30. As shown by the detail of FIG. 3, a spring-biased latch 33 is capable of capturing and holding the optical fiber within groove 28. In the retracted position shown in FIG. 2, it is intended that the groove 28 hold the optical fiber in alignment with routing wheel 17 as fiber that is unwound from reel 16 is routed by the routing wheel.

The manipulator 18 is robotically controlled to move a shaft 32 in the X-Y and θ directions, as described in the Burack et al. application. A programmed computer, not shown, controls all movements of the apparatus of the drawing, as well as the routing movements. That is, appropriate control signals from the computer control motor 15 and air cylinders 25 and 31, as well as movements of the manipulator 15. A preferred computer system is described in the Burack et al. application, and modifications to control the additional elements of this invention are within the ordinary skill of the worker in the art.

Figure 13:
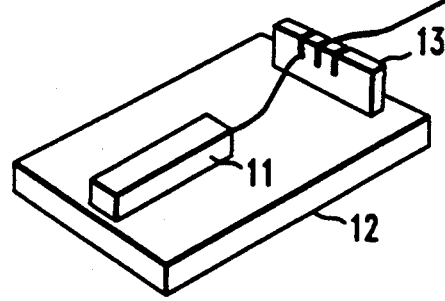
Figure 13:
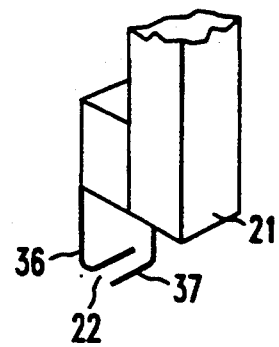
Figure 4:
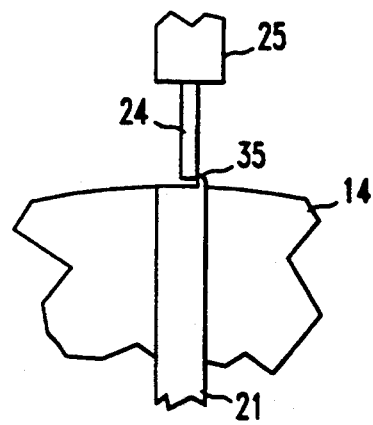
FIG. 4 is a detail of part of the bar mechanism of the apparatus of FIGS. 1 and 2.
Figure 5:
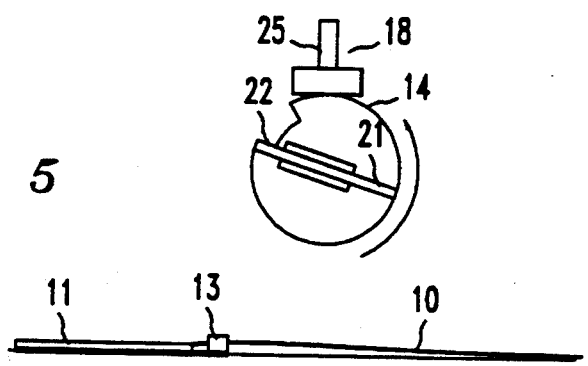
FIGS. 5–11 arc side views of the apparatus of FIGS. 1 and 2 at various stages of operation.
Figure 6:
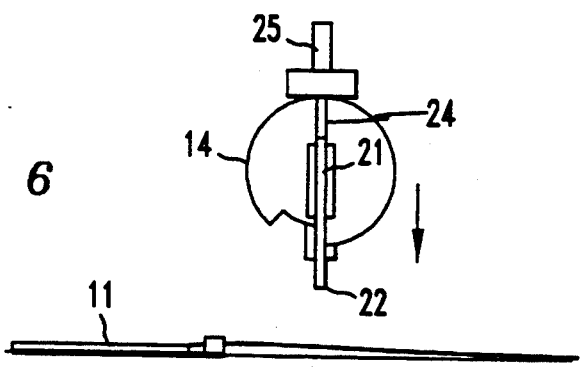

FIGS. 5–11 illustrate successive steps in picking up and winding the optical fiber preparatory to routing. The winding tool 14 initially has its central axis perpendicular to fiber 10 and is rotated in the counterclockwise direction, as shown, with the hook 22 retracted. Referring to FIG. 4, when the bar 21 reaches the vertical position, a stop 35 engages piston 24 of air cylinder 25, which stops the winding tool 14. The computer generates a signal which stops the motor 15, and it also generates a signal that actuates air cylinder 25 to extend piston 24, as shown in FIG. 6. As shown in FIG. 13, the extended hook 22 has two lateral portions 36 and 37 which are parallel to optical fiber 10 and are located on opposite sides of the optical fiber 10, as is shown in more detail in FIG. 13. The winding tool, including the hook, is then lowered, as shown by the arrow of FIG. 6, so that the two lateral extensions 36 and 37 are below the optical fiber and on opposite sides of it. The standoff 13 provides a gap between the optical fiber 10 and the surface on which it rests.

Figure 7:
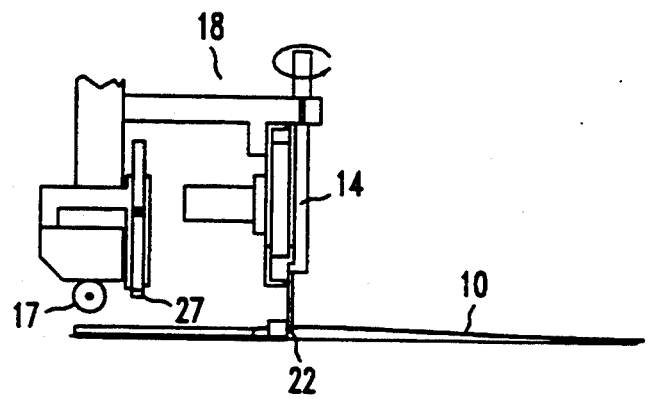
Figure 8:
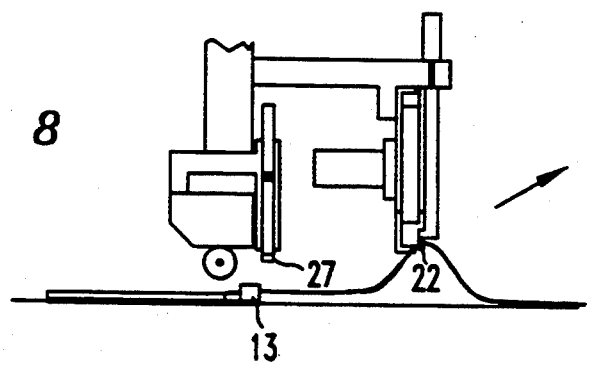

Referring to FIG. 7, the manipulator 18 is next rotated on an axis extending through hook 22. This rotation causes the lateral portions 36 and 37 of FIG. 1 to underlie the fiber 10 so that it can be picked up. FIG. 8 shows the next step in which the manipulator 18 moves upwardly and to the right, and thereafter the hook 22 is retracted.

Figure 9:
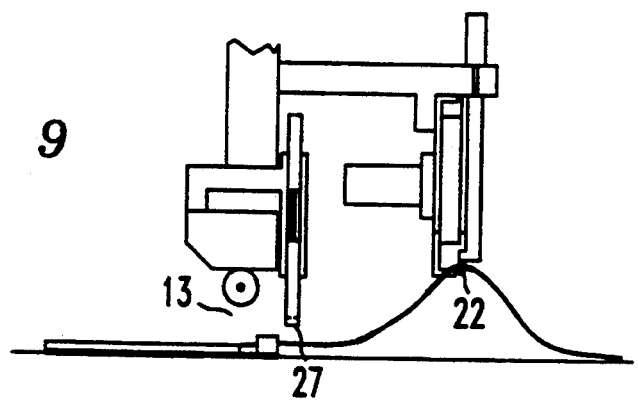
Figure 10:
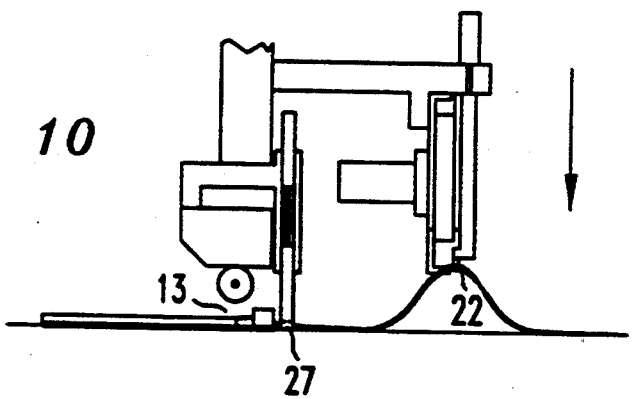

As mentioned before, coil springs 23 of FIG. 1 cause the hook to retract when the piston of air cylinder 25 is retracted. The movement of the manipulator to the right positions alignment tool 27 to the right of standoff device 13. In FIG. 9, the alignment tool 27 is extended, and in FIG. 10, the manipulator 18 is lowered, as shown by the arrow, so that the fiber can be captured in groove 28 of alignment tool 27. As shown in FIG. 3, the latch 33 secures the fiber within groove 28.

Figure 11:
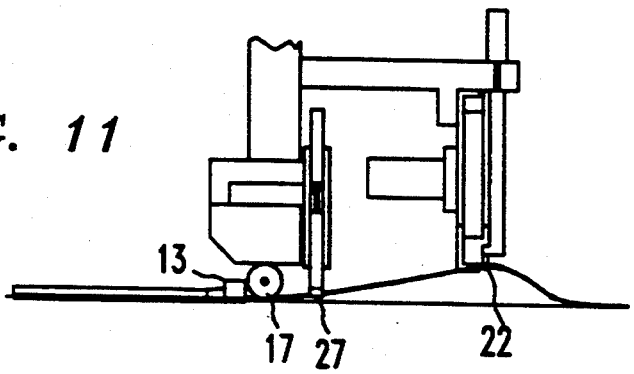

Next, the alignment tool 27 is retracted, and the manipulator is moved to the right, as shown in FIG. 11, so that routing wheel 17 is to the right of standoff device 13. In this position, the routing wheel contacts the surface preparatory to routing of the fiber. The optical fiber 10 is then wound around reel 16 by rotating the winding tool 14 in the clockwise direction. The stop 35 of FIG. 4 has a cam surface so that, during rotation in the clockwise direction, it allows the winding wheel 14 to continue rotating. The rotation of winding wheel 14 is driven by motor 15 as mentioned before. After winding, the routing begins with the first part of the fiber wound on the reel being first fed to the routing wheel 17. As mentioned before, the reel 16 is free to move, due to the bearings 20, to allow unwinding.

The manipulator and its various components including air cylinders 31 and 25 are preferably part of a robotic workstation, as is generally described in the Burack et al. application. The programming of any of various automatic robotic workstations to accomplish the functions described is within the skill of a worker in the art. With the optical fiber 10 initially properly located, the entire pick-up and winding process is performed automatically.

The embodiment described is intended to be merely illustrative of the inventive concept. Various other embodiments and modifications may be made by those skilled in the art without departing from the spirit and scope of the invention.

I claim:

1. A method for routing optical fiber comprising the steps of: providing a reel of optical fiber on a manipulator; threading part of the optical fiber from said reel over a peripheral portion of a rotatable wheel on an end of said manipulator; moving the manipulator such that the peripheral portion of the wheel presses said optical fiber against the surface of a substrate and causes adherence of the optical fiber to the substrate; moving the manipulator in a direction parallel to said flat surface; causing the wheel to rotate; causing optical fiber to feed from the reel to the wheel for adherence to the substrate; wherein said optical fiber is not initially contained on the reel and is connected at one end to a device, and wherein the improvement comprises:

providing on the manipulator a winding tool that is rotatable with respect to the reel;

using a hook to capture optical fiber extending from said device and to engage the fiber with the winding tool;

using the winding tool to wind the optical fiber around the reel;

and positioning said wheel between said device and said reel such that the wheel can press the optical fiber against the substrate, and thereafter causing said optical fiber to feed from the reel to the wheel.

2. The method of claim 1 further comprising the step of:

prior to the winding step, engaging said optical fiber between said reel and said wheel with an alignment tool;

securing said optical fiber in said alignment tool during the winding step;

and using the alignment tool to insure engagement of the periphery of the wheel with said optical fiber.

3. The method of claim 2 wherein:

said winding tool, reel, wheel and alignment tool are connected to and form part of said manipulator.

4. The method of claim 3 further comprising the step of:

prior to the step of using the hook, overlapping said optical fiber on a standoff device for providing a space between the optical fiber and a surface on which it rests to permit engagement by the hook.

5. The method of claim 4 further comprising the step of:

prior to using the hook, the manipulator is moved to position the hook over the portion of the optical fiber separated from the surface;

and the step of using the hook comprises the step of lowering the hook such that a lateral extension thereof is positioned generally parallel to the fiber, then rotating the hook such that the lateral part thereof underlies said optical fiber, and thereafter raising the hook for engagement of the fiber with said winding tool.

6. The method of claim 2 wherein:

the wheel has a first groove around its periphery to hold the optical fiber in place;

and the alignment tool has a second groove for holding the optical fiber in alignment with said first groove.

7. The method of claim 6 wherein:
the second groove has a latch for capturing the optical fiber;
and prior to the winding step, the alignment tool is raised with the optical fiber captured in the second groove, and the wheel is pressed against the optical fiber.

8. The method of claim 5 wherein:
the alignment tool is lowered from the manipulator to engage the optical fiber and is thereafter raised with the fiber secured therein;
thereafter the manipulator is moved laterally, and the wheel is lowered to contact the optical fiber.

9. The method of claim 8 wherein:
after the wheel contacts the optical fiber, the manipulator is moved laterally to cause the wheel to rotate, the rotating wheel causing the reel to unwind and to feed optical fiber to the wheel.

10. The method of claim 9 wherein:
the movements of the manipulator, including the winding tool and the hook, are controlled by a stored computer program.

11. A method for routing an optical fiber extending from a device comprising the steps of:
mounting the device on a mounting plate supported on a substrate and defining a standoff device;
separating the fiber from the surface by draping it over the standoff device;
orienting over the fiber a manipulator comprising a winding tool, a reel and a routing wheel;
extending a hook from the winding tool to capture part of the fiber extending from the standoff device;
retracting the hook;
lowering the manipulator such that the routing wheel contacts the fiber and presses it against a substrate surface;
using the winding tool to wind the fiber around the reel; and
moving the manipulator laterally to cause the routing wheel to rotate and to unwind optical fiber from the reel and to cause the optical fiber to adhere to said substrate.

12. The method of claim 11 further comprising the step of:
prior to the winding step, engaging the optical fiber between said reel and said standoff device with an alignment tool;
securing the optical fiber in the alignment tool during the winding step;
and using the alignment tool to insure engagement of the periphery of the routing wheel with said optical fiber after the winding step.

13. The method of claim 12 wherein:
the step of using the hook comprises the step of lowering the hook such that a lateral portion thereof is positioned substantially parallel to the fiber, then rotating the manipulator such that the lateral portion of the hook underlies the optical fiber, and thereafter raising the hook.

14. The method of claim 13 wherein:
during the step of lowering the hook, the alignment tool is positioned over the mounting plate;
and after the hook is raised, the manipulator is moved laterally such that the alignment tool is between the reel and the standoff device.

15. The method of claim 14 wherein:
during the step of securing the optical fiber in the alignment tool, the routing wheel overlies the mounting plate;
and after said securing, the manipulator is moved laterally such that the routing wheel is between the alignment tool and the standoff device.

16. Apparatus for routing an optical fiber extending from a device comprising:
a manipulator comprising a winding tool, a rotatable reel and a rotatable routing wheel;
means for moving the manipulator laterally and vertically;
means for extending a hook from said winding tool to capture part of the optical fiber extending from the device and for retracting said hook;
means comprising said winding tool for driving said hook on a circular path around said reel, thereby to wind the optical fiber on the reel;
said routing wheel comprising means for pressing part of the optical fiber against a flat surface of a substrate coated with adhesive; and
means for moving the manipulator in a direction parallel to said flat surface at an appropriate speed and direction to cause the routing wheel to rotate and to exert sufficient tension on the optical fiber to cause it to unreel from the reel for adherence to the coated substrate.

17. The apparatus of claim 16 further comprising:
a standoff device over which the optical fiber can be located for creating a gap to permit the hook to capture the optical fiber.

18. The apparatus of claim 17 wherein:
said manipulator further comprises means for extending the alignment tool to capture the optical fiber between the winding tool and the device and to hold it in a predetermined location such that it can be engaged by the routing wheel.

19. The apparatus of claim 18 wherein:
said routing wheel has a first groove around its periphery to hold the optical fiber in place;
and the alignment tool has a second groove for holding the optical fiber in alignment with said first groove.

20. The apparatus of claim 19 wherein:
said second groove has a latch for capturing the optical fiber;
and prior to the winding step, the manipulator comprises means for raising the alignment tool with the optical fiber captured in the second groove, and for pressing the routing wheel against the optical fiber.

21. The apparatus of claim 20 wherein:
the movements of the manipulator including the winding tool and the hook are controlled by a stored computer program.

* * * * *